US011998049B2

(12) United States Patent
Yilmaz et al.

(10) Patent No.: US 11,998,049 B2
(45) Date of Patent: Jun. 4, 2024

(54) AEROSOL GENERATION ARTICLE

(71) Applicant: Nicoventures Trading Limited, London (GB)

(72) Inventors: Ugurhan Yilmaz, London (GB); Mark Potter, London (GB)

(73) Assignee: NICOVENTURES TRADING LIMITED, London (GB)

( * ) Notice: Subject to any disclaimer, the term of this patent is extended or adjusted under 35 U.S.C. 154(b) by 954 days.

(21) Appl. No.: 15/733,505

(22) PCT Filed: Feb. 15, 2019

(86) PCT No.: PCT/EP2019/053822
§ 371 (c)(1),
(2) Date: Aug. 14, 2020

(87) PCT Pub. No.: WO2019/158698
PCT Pub. Date: Aug. 22, 2019

(65) Prior Publication Data

US 2021/0100284 A1 Apr. 8, 2021

(30) Foreign Application Priority Data

Feb. 16, 2018 (GB) ...................................... 1802591

(51) Int. Cl.
*A24F 47/00* (2020.01)
*A24F 40/20* (2020.01)
(Continued)

(52) U.S. Cl.
CPC .............. *A24F 40/42* (2020.01); *A24F 40/20* (2020.01); *A24F 40/30* (2020.01); *A24F 40/44* (2020.01);
(Continued)

(58) Field of Classification Search
CPC .......... A24F 40/42; A24F 40/20; A24F 40/30; A24F 40/44; A24F 40/46; A24F 40/57;
(Continued)

(56) References Cited

U.S. PATENT DOCUMENTS 6,516,796 B1 2/2003 Cox et al.
8,910,640 B2 12/2014 Sears et al.
(Continued)

FOREIGN PATENT DOCUMENTS

AU 2019220433 B2 3/2022
CN 103932401 A 7/2014
(Continued)

OTHER PUBLICATIONS

International Search Report, Application No. PCT/EP2019/053822, dated May 24, 2019, 3 pages.
(Continued)

*Primary Examiner* — Abdullah A Riyami
*Assistant Examiner* — Nelson R. Burgos-Guntin
(74) *Attorney, Agent, or Firm* — Husch Blackwell LLP

(57) ABSTRACT

There is described an aerosol provision article for use in an aerosol provision system for generating an inhalable medium comprising an aerosol when a user draws on the aerosol provision system. The aerosol provision article includes a structure for transporting liquid from a liquid reservoir and heating the transported liquid to generate a flow of aerosol; and a region for receiving a substance which, in use, the flow of aerosol passes through and heats the substance before exiting the aerosol provision article, wherein the substance modifies a property of the flow of aerosol and wherein the structure is positioned so that when the structure heats the transported liquid to generate the flow of aerosol the structure also provides additional heat to the substance in the region.

9 Claims, 2 Drawing Sheets

(51) Int. Cl.

| | |
|---|---|
| ***A24F 40/30*** | (2020.01) |
| ***A24F 40/42*** | (2020.01) |
| ***A24F 40/44*** | (2020.01) |
| ***A24F 40/46*** | (2020.01) |
| ***A24F 40/57*** | (2020.01) |
| ***H05B 3/20*** | (2006.01) |
| *A24F 40/10* | (2020.01) |

(52) U.S. Cl.
CPC .............. *A24F 40/46* (2020.01); *A24F 40/57* (2020.01); *H05B 3/20* (2013.01); *A24F 40/10* (2020.01); *H05B 2203/021* (2013.01)

(58) Field of Classification Search
CPC .......... A24F 40/10; A24F 40/40; A24F 40/50; H05B 3/20; H05B 2203/021; A24B 15/167
See application file for complete search history.

(56) References Cited

U.S. PATENT DOCUMENTS

| | | | | |
|---|---|---|---|---|
| 9,078,473 | B2 | 7/2015 | Worm et al. | |
| 2013/0037041 | A1 | 2/2013 | Worm | |
| 2014/0000638 | A1 | 1/2014 | Sebastian et al. | |
| 2014/0096781 | A1 | 4/2014 | Sears et al. | |
| 2014/0209105 | A1 | 7/2014 | Sears | |
| 2014/0261486 | A1 | 9/2014 | Potter et al. | |
| 2015/0320116 | A1* | 11/2015 | Bleloch .................. | A24F 40/44 219/628 |
| 2016/0106153 | A1 | 4/2016 | Zhu | |
| 2016/0262457 | A1 | 9/2016 | Borkovec et al. | |
| 2016/0324216 | A1 | 11/2016 | Li et al. | |
| 2016/0345632 | A1 | 12/2016 | Lipowicz | |
| 2017/0188635 | A1 | 7/2017 | Force et al. | |
| 2017/0251723 | A1 | 9/2017 | Kobal | |
| 2017/0347706 | A1 | 12/2017 | Aoun | |
| 2017/0347714 | A1 | 12/2017 | Metz et al. | |
| 2018/0007966 | A1 | 1/2018 | Li | |
| 2019/0124982 | A1 | 5/2019 | Atkins et al. | |

FOREIGN PATENT DOCUMENTS

| | | | |
|---|---|---|---|
| CN | 104287098 | | 1/2015 |
| CN | 104397875 | A | 3/2015 |
| CN | 204812043 | | 12/2015 |
| CN | 205492620 | U | 8/2016 |
| CN | 205865986 | U | 1/2017 |
| CN | 107529825 | A | 1/2018 |
| CN | 107635419 | A | 1/2018 |
| CN | 206978758 | U | 2/2018 |
| GB | 2529201 | A | 2/2016 |
| GB | 2539054 | A | 12/2016 |
| JP | 2017506076 | A | 3/2017 |
| JP | 2017515493 | A | 6/2017 |
| JP | 2017529896 | A | 10/2017 |
| JP | 2017538398 | A | 12/2017 |
| KR | 20170073664 | A | 6/2017 |
| KR | 20180005212 | A | 1/2018 |
| RU | 2596108 | C1 | 8/2016 |
| RU | 2603121 | C2 | 11/2016 |
| RU | 2611487 | C2 | 2/2017 |
| RU | 2635970 | C2 | 11/2017 |
| WO | 2013126777 | A2 | 8/2013 |
| WO | 2015117702 | A1 | 8/2015 |
| WO | 2016024083 | A1 | 2/2016 |
| WO | 2016090426 | A1 | 6/2016 |
| WO | 2016135331 | A1 | 9/2016 |
| WO | WO 2016135342 | | 9/2016 |
| WO | 2016179376 | A1 | 11/2016 |
| WO | 2017005471 | A1 | 1/2017 |
| WO | WO 2017185051 | | 10/2017 |
| WO | WO 2019081571 | | 5/2019 |
| WO | 2019158697 | A1 | 8/2019 |

OTHER PUBLICATIONS

"International Preliminary Report on Patentability received for PCT Patent Application No. PCT/EP2019/053821, dated Aug. 27, 2020", 8 pages.
"International Preliminary Report on Patentability received for PCT Patent Application No. PCT/EP2019/053822, dated Aug. 27, 2020", 8 pages.
"International Search Report, Application No. PCT/EP2019/053821, dated May 24, 2019", 5 pages.
"Notice of Allowance received for Korean Patent Application No. 10-2020-7023629, dated Nov. 14, 2022", 4 pages (2 pages of English Translation and 2 pages of Official Copy).
"Office Action and Search Report received for Chinese Patent Application No. 2019800132020, dated Feb. 27, 2023", 11 pages (8 pages of English Translation and 3 pages of Official Copy).
"Office action and Search Report received for Chinese Patent Application No. 201980013670.8, dated Nov. 25, 2022", 20 pages (9 pages of English Translation and 11 pages of Official Copy).
"Office Action received for Colombian Patent Application No. NC2020/0009879, dated Sep. 19, 2022", 6 pages.
"Office Action received for Japanese Patent Application No. 2020-543225, dated Sep. 14, 2021", 6 pages (3 pages of English Translation and 3 pages of Official Copy).
"Office Action received for Japanese Patent Application No. 2020-543226, dated Sep. 14, 2021", 6 pages (3 pages of English Translation and 3 pages of Official Copy).
"Office Action received for Russian Patent Application No. 2020127217, dated Mar. 4, 2021", 8 pages (2 pages of English Translation and 6 pages of Official Copy).
"Office Action received for Ukrainian Patent Application No. 202005197, dated May 9, 2023", 4 pages (Official Copy Only).
"Search Report received for Japanese Patent Application No. 2020-543225, dated Sep. 7, 2021", 17 pages (8 pages of English Translation and 9 pages of Official Copy).
"Search Report received for Russian Patent Application No. 2020127202, dated Mar. 17, 2021", 2 pages (Official Copy Only).
"Written Opinion received for PCT Patent Application No. PCT/EP2019/053821, dated May 24, 2019", 6 pages.
"Written Opinion received for PCT Patent Application No. PCT/EP2019/053822, dated May 24, 2019", 6 pages.

* cited by examiner

AEROSOL GENERATION ARTICLE

PRIORITY CLAIM

The present application is a National Phase entry of PCT Application No. PCT/EP2019/053822, filed Feb. 15, 2019, which claims priority from GB Patent Application No. 1802591.6, filed Feb. 16, 2018, each of which is hereby fully incorporated herein by reference.

TECHNICAL FIELD

The present disclosure relates to an aerosol provision article for use in an aerosol provision system for generating an inhalable medium.

BACKGROUND

Smoking articles such as cigarettes, cigars and the like burn tobacco during use to create tobacco smoke.

Attempts have been made to provide alternatives to these articles that burn tobacco by creating products that release compounds without burning.

Examples of such products are heating devices which release compounds by heating, but not burning, the material. The material may be for example tobacco or other non-tobacco products, which may or may not contain nicotine.

As another example, there are so-called e-cigarette devices. These devices typically contain a liquid which is heated to vaporize the liquid to produce an inhalable vapor or aerosol. The liquid may contain nicotine and/or flavorings and/or aerosol-generating substances, such as glycerol. The known e-cigarette devices typically do not contain or use tobacco.

As yet another example, there are so-called hybrid devices. These hybrid devices typically contain separately a liquid and tobacco or other flavor material. The liquid is heated to vaporize the liquid to produce an inhalable vapor or aerosol which passes through the tobacco or other flavor material so that a flavor is imparted to the vapor or aerosol.

SUMMARY

According to a first aspect of the present disclosure, there is provided an aerosol provision article for use in an aerosol provision system for generating an inhalable medium comprising an aerosol when a user draws on the aerosol provision system, the aerosol provision article comprising: a structure for transporting liquid from a liquid reservoir and heating the transported liquid to generate a flow of aerosol; and a region for receiving a substance which, in use, the flow of aerosol passes through and heats the substance before exiting the aerosol provision article, wherein the substance modifies a property of the flow of aerosol and wherein the structure is positioned so that when it heats the transported liquid to generate the flow of aerosol it also provides additional heat to the substance in the region.

The structure may comprise a substantially planar heating region for heating the transported liquid and the substance in the region.

The substantially planar heating region may face the region for receiving the substance.

The region may have a cross sectional area that is substantially parallel with the planar heating region.

The structure may be a wick.

The wick may be a mesh wick

According to a second aspect of the disclosure there is provided an aerosol provision system for generating an inhalable medium comprising an aerosol, the system comprising: the aerosol provision article of the first aspect and an aerosol provision device comprising a control for controlling the heating of the structure.

BRIEF DESCRIPTION OF THE DRAWINGS

Embodiments of the disclosure will now be described, by way of example only, with reference to the accompanying drawings, in which.

DETAILED DESCRIPTION

Figure 1:
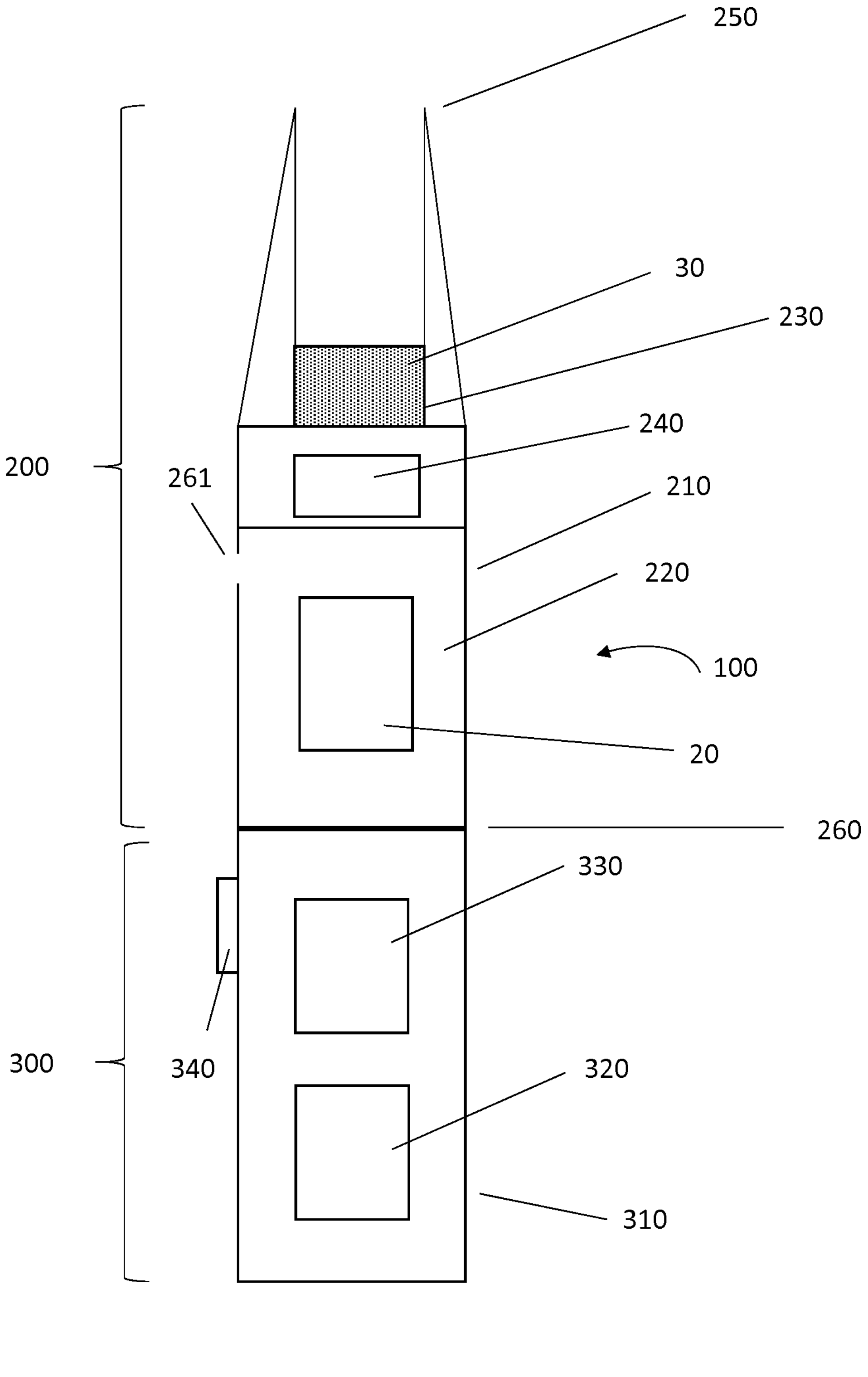
FIG. 1 shows a schematic longitudinal cross-sectional view of a first aerosol provision system for generating an inhalable medium.

Referring to FIG. 1, a schematic of an aerosol provision system 100 is illustrated. The aerosol provision system 100 is an inhalation device (i.e. a user uses it to inhale an aerosol provided by the system 100) and the system 100 is a hand-held system. In this example, the system 100 is an electronic device.

In broad outline, the system 100 volatilizes a liquid 20, for example, an e-cig liquid received in the system 100 to form a vapor and/or an aerosol which passes through a further substance 30 that is also received in the system 100. In at least some examples a vapor is produced that then at least partly condenses to form an aerosol before exiting the system 100 for inhalation by a user (not shown). The further substance may modify a property, for example the flavor, of the vapor and/or aerosol before the vapor and/or aerosol passes out of the system 100 for inhalation by a user.

In this respect, first it may be noted that, in general, a vapor is a substance in the gas phase at a temperature lower than its critical temperature, which means that for example the vapor can be condensed to a liquid by increasing its pressure without reducing the temperature. On the other hand, in general, an aerosol is a colloid of fine solid particles or liquid droplets, in air or another gas. A "colloid" is a substance in which microscopically dispersed insoluble particles are suspended throughout another substance.

For reasons of convenience, as used herein the term aerosol should be taken as meaning an aerosol, a vapor or a combination of an aerosol and vapor.

Returning to FIG. 1, the system 100 of this example comprises an aerosol provision article 200 (which may be referred to as a cartridge) and an aerosol provision device 300. The aerosol provision article 200 is for containing the e-cig liquid 20 and the further substance 30 and the aerosol provision device 300 is for powering and controlling the system 100.

The aerosol provision article 200 comprises a first 'upper' housing 210 and the aerosol provision device 300 comprises a second 'lower' housing 310. In this example, the first housing 210 is releasably connectable to the lower housing 310.

The first housing 210 comprises a liquid reservoir 220 for containing the e-liquid and a region 230 for receiving the further substance 30.

The first housing 210 also contains a combined wick and heating arrangement 240. In this example, the combined wick and heating arrangement 240 comprises a mesh wick (not shown in FIG. 1) which provides the dual purpose of wicking e-cig liquid 20 from the liquid reservoir 220 and, in use, heating the wicked e-cig liquid to generate a flow of aerosol which then passes through the substance 30 before exiting the aerosol provision article 200 when a user draws on the aerosol provision article 200. As the aerosol flow passes through the substance 30 the aerosol flow heats the substance 30 and one or more components of the substance 30 become entrained in the aerosol flow which may alter, or add to, a property of the flow of aerosol, for example taste.

Advantageously, as the combined wick and heating arrangement 240 is a unitary structure that provides the dual purpose of wicking e-cig liquid 20 from the liquid reservoir 220 and, in use, heating the wicked e-cig liquid to generate a flow of aerosol, it requires fewer components than systems in which a separate wick and heating arrangement, for example a wick with a coil heater around it, are used to generate the flow of aerosol.

Advantageously, the combined wick and heating arrangement 240 is positioned close enough to the substance 30 in the region 230 so that when it heats the wicked e-cig liquid to generate a flow of aerosol it also provides additional heat to the substance 30 in addition to the heat provided by the aerosol flow which additional heat may enhance the effect the substance 30 has on the aerosol flow.

In some examples, a dimension or size of the region 230, for example, its cross-sectional area and the corresponding dimension or size of the combined wick and heating arrangement 240, for example its cross-sectional area, may be set at a predetermined ratio to optimize the additional heating of the substance 30 by the combined wick and heating arrangement 240. In one example, the cross-sectional area of the combined wick and heating arrangement 240 is at least 80% of the cross-sectional area of the region 230.

The first housing 210 defines the proximal end (or mouth end) 250 which is a mouthpiece of the system 100 and at an opposite end a base section 260 that connects to the second housing 310.

To that end, the base section 260 comprises a connector part, for example, a screw thread or a bayonet fit for releasably connecting the first housing 210 to the second housing 310. The first housing 210 may further comprise one or more air inlets 261.

The second housing 310 contains a power source 320, typically a battery, for powering various components of the system 100, including the heating arrangement 240, to which it is electrically connected, as will be discussed further below.

The battery 320 may be a rechargeable battery or a disposable battery. A controller 330, which may comprise a micro-chip and associated circuitry is also provided in the second housing 310 for controlling the operation of various components of the system 100, as will be discussed further below. A user input means 340, for example one or more control buttons, may be provided on the exterior of the second housing 310 for a user to operate the controller 330.

The liquid reservoir 220 may take various different forms. In one example, the liquid reservoir 220 is in the form of an annular chamber which extends axially in the first housing 210 between the proximal end 250 and the base section 260.

The liquid 20 can be a liquid that is volatilizable at reasonable temperatures, such as in the range of 100-300° C. or more particularly around 150-250° C., as that helps to keep down the power consumption of the system 100. Suitable materials include those conventionally used in e-cigarette devices, including for example propylene glycol and glycerol (also known as glycerine).

Accordingly, in use, as a user draws on the proximal end 250, air is drawn through the one or more air inlets 261. The heater arrangement 240 is powered by the user operating the control button 340 (or alternatively by a puff detector (not shown), as is known per se) and liquid 20 drawn from the liquid reservoir 220 is heated by the heater arrangement 240 to volatilize the liquid 20 to generate aerosol which mixes with air flowing from the air inlet 261 to produce a flow of aerosol. The flow of aerosol is drawn through the substance 30 in the region 230 and then out of the system 100 for inhalation by the user.

The substance 30 is a substance that may be used to impart a flavor to the aerosol produced from the liquid 20 as the aerosol passes through the substance 30. The substance 30 may for example consist of or comprise tobacco. As the aerosol passes through and over the tobacco, the aerosol entrains organic and other compounds or constituents from the tobacco material that lend tobacco its organoleptic properties, thus imparting the flavor to the aerosol as it passes through the region 230.

The substance 30 may comprise of tobacco per se, different varieties of tobacco, tobacco derivatives, expanded tobacco, reconstituted tobacco, ground tobacco, tobacco extract, homogenized tobacco or tobacco substitutes. In the case of tobacco, the second substance 104, etc. may be in the form of a rod of tobacco, a pod or plug of tobacco, loose tobacco, agglomerates, etc., and may be in relatively dry form or in relatively moist form for example. The substance 30 may include other, non-tobacco, products, which, depending on the product, may or may not contain nicotine.

The substance 30 may be for modifying a property of the aerosol other than (or in addition) to flavor.

In some examples, the substance 30 may be or include a substance that modifies one or more other organoleptic properties of the aerosol (e.g. modifying the feel or smell or look of the aerosol to the user).

In some examples, the substance 30 may be or include a substance that modifies the PH of the aerosol by either lowering or raising the PH (e.g. modifying the acidity or the basicity of the aerosol).

In some examples, the substance 30 may be or include a substance that modifies (e.g. reduces) the amount of aldehydes in the aerosol.

In some examples, the substance 30 may be or include a substance that modifies different combinations of two or more of these or indeed other properties of the aerosol.

It will be understood however that materials other than tobacco may be used to impart different flavors to the aerosol.

If the substance 30 is or includes tobacco, it may be that the aerosol stream draws sufficient nicotine from the substance 30. Alternatively or additionally, if the substance 30 does not contain any tobacco, the substance 30 may be enhanced with nicotine, for example by coating the material with nicotine. Indeed, even in the case that the substance 30 is or includes tobacco, the substance 30 may be coated or otherwise enhanced with nicotine. As another example, whether or not the substance 30 is or includes tobacco and/or includes nicotine, nicotine may be provided in the liquid 20. Accordingly, where it is intended that the system 100 provides nicotine for the user, the nicotine may be provided in the liquid 20, may be obtained from the substance 30 in the case that the material is or includes tobacco, may be provided as a coating or the like on the substance 30 if it is non-tobacco material, may be provided as a coating or the like on the substance 30 if it is tobacco material, or any combination of these. Likewise, flavorings may be added to the substance 30 (whether or not the substance is or includes tobacco) and/or to the liquid 20.

In some examples, it may be that the user only needs to top up or replace the substance 30 from time to time, with sufficient liquid 20 being provided for several uses. Once the liquid 20 has been consumed, the user disposes of the aerosol provision article 200 and then uses a new one.

In other examples, the housing 210 is not designed to be disposable and instead the user only needs to top up or replace the liquid 20 from time to time.

In some examples, the aerosol provision article 200 and the aerosol provision device 300 are integrated in a single device and are not arranged to be detachable from each other.

Providing the additional heating of the substance 30 may be an important factor in providing the user with a satisfactory sensory experience. For example, if the substance 30 comprises tobacco, then the additional heating of the tobacco may increase the tobacco taste amplitude experienced by a user and may cause more constituents such as nicotine to become entrained in the flow of aerosol than if the heating were provided by the flow of aerosol alone.

Figure 2A:
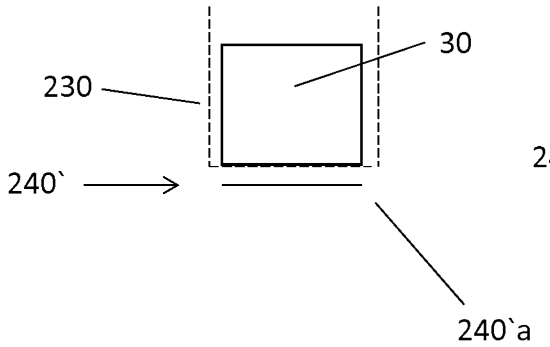
FIG. 2*a* shows a schematic longitudinal cross-sectional view of a first heating arrangement for the aerosol provision system of FIG. 1.
Figure 2B:
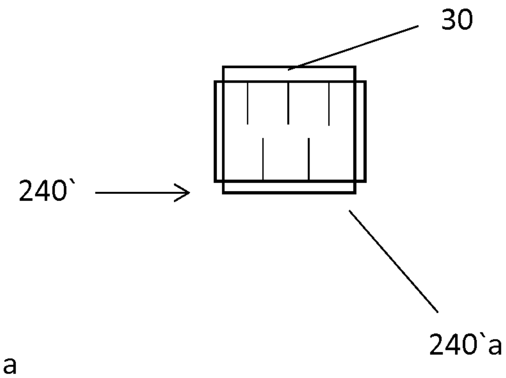
FIG. 2*b* shows a schematic plan view of the first heating arrangement.

Referring now to FIGS. 2*a* and 2*b*, there is schematically illustrated an example of a combined wick and heating arrangement 240' suitable for use as the combined wick and heating arrangement 240 in the aerosol provision article 200 of FIG. 1 in order to wick and heat liquid 20 from the liquid reservoir 220 and to heat the substance 30 in the region 230.

The combined wick and heating arrangement 240' is in fluidic contact with the liquid 20 contained in the liquid reservoir 220. The wick and heating arrangement 240' acts to draw in liquid 20 from the liquid reservoir 220 by capillary action.

The combined wick and heating arrangement 240' is also in electrical contact with the battery 320 via the control circuitry 330 in order to receive power to heat wicked liquid from the liquid reservoir 220.

In this example, the combined wick and heating arrangement 240' comprises a mesh wick 240'*a*.

The mesh wick 240'*a* may be a wire mesh comprising an arrangement, for example a grid, of intertwined metal wires or strands that define a multiplicity of interstices.

The mesh wick 240'*a* is substantially planar and comprises a planar heating region that heats the wicked liquid to generate the aerosol flow. The planar heating region faces the region 230 for receiving the substance 30 and is located just below the substance 30 when the substance 30 is in the region 230.

Advantageously, in use, the heat generated by the planar heating region is sufficient to heat the substance 30 in the region 230 in addition to the heat provided to the substance by the flow of aerosol.

The cross-sectional area of the region 230 is substantially parallel with the planar heating region of the mesh wick 240'*a* to maximize the amount of the surface area of the substance 30 that is heated by the mesh wick 240'.

In use, and particularly in the case that the substance 30 is tobacco, it can be advantageous that the tobacco, or at least the surface of the tobacco, be heated to a temperature of between around 190° C. to 210° C., for example around 200° C., so as to ensure that an adequate or appropriate amount of the compounds are released from the tobacco.

The amount of tobacco present may be for example in the range 50 to 300 mg or so. A most suitable value for the amount of tobacco may be for example in the range 50 to 150 mg, with 130 mg being a value that is currently found to be particularly suitable in some applications. In a typical example, the amount of tobacco that is heated per operation of the system (i.e. per puff) may be in the corresponding range of around 8 to 50 mg.

In the examples described above, the combined wick and heating arrangement 240 is between the region 230 and the liquid reservoir 220. Other arrangements are possible, for example, the liquid reservoir may be to one side of or on both sides of the combined wick and heating arrangement 240.

In the examples described above, a wick is used to both transport liquid from the liquid reservoir 220 and to heat the liquid to generate the aerosol flow. In other examples, a structure other than a wick may be used to transport liquid from the liquid reservoir 220 and to heat the liquid to generate the aerosol flow. The structure may for example be a plate or the like that channels liquid from the liquid reservoir 220.

In some embodiments, the structure comprises a substantially planar heating region for heating the transported liquid and the substance 30 in the region 230.

In some of the examples described above the mesh wick is planar but other geometries are possible, for example, a tubular mesh wick.

Other types of wick may be used as well.

In the examples discussed above, there is small gap between the combined wick and heating arrangement 240 and the region 230. This is not essential and so in some examples the structure that is used to transport liquid from the liquid reservoir 220 and to heat the liquid to generate the aerosol flow may touch the substance 30 in the region 230.

As used herein, the terms "flavor" and "flavorant" refer to materials which, where local regulations permit, may be used to create a desired taste or aroma in a product for adult consumers. They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus *Mentha*), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening

The invention claimed is:

1. An aerosol provision article for use in an aerosol provision system for generating an inhalable medium comprising an aerosol when a user draws on the aerosol provision system, the aerosol provision article comprising:

a structure for transporting liquid from a liquid reservoir and heating the transported liquid to generate a flow of aerosol; and a region for receiving a substance which, in use, the flow of aerosol passes through and heats the substance before exiting the aerosol provision article, wherein the substance modifies a property of the flow of aerosol and wherein the structure is positioned so that when the structure heats the transported liquid to generate the flow of aerosol the structure also provides additional heat to the substance in the region.

2. The aerosol provision article according to claim 1, wherein the structure comprises a substantially planar heating region for heating the transported liquid and the substance in the region.

3. The aerosol provision article according to claim 2, wherein the substantially planar heating region faces the region for receiving the substance.

4. The aerosol provision article according to claim 2, wherein the region for receiving the substance has a cross-sectional area that is substantially parallel with the substantially planar heating region.

5. The aerosol provision article according to claim 1, wherein the structure is a wick.

6. The aerosol provision article according to claim 5, wherein the wick is a mesh wick.

7. The aerosol provision article according to claim 1, further comprising the liquid reservoir for containing the liquid.

8. An aerosol provision system for generating an inhalable medium comprising an aerosol, the system comprising:

the aerosol provision article of claim 1; and an aerosol provision device comprising a control for controlling the heating of the structure.

9. The aerosol provision system according to claim 8, wherein the aerosol provision article and the aerosol provision device are releasably connectable together.

* * * * *